(12) United States Patent
Hall et al.

(10) Patent No.: US 7,841,506 B2
(45) Date of Patent: Nov. 30, 2010

(54) METHOD OF MANUFACTURE OF DUAL TITANIUM ALLOY IMPELLER

(75) Inventors: James A. Hall, Gilbert, AZ (US); Krish Krishnamurthy, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 1112 days.

(21) Appl. No.: 10/916,796

(22) Filed: Aug. 11, 2004

(65) Prior Publication Data

US 2006/0034695 A1    Feb. 16, 2006

(51) Int. Cl.
*B23K 20/12* (2006.01)
(52) U.S. Cl. .................. 228/113; 228/2.3; 228/112.1
(58) Field of Classification Search ............. 228/2.3, 228/2.1, 112.1, 113; 156/73.5, 580; 416/244 A, 416/245 A, 248, 213 R
See application file for complete search history.

(56) References Cited

U.S. PATENT DOCUMENTS

| | | | |
|---|---|---|---|
| 2,757,901 A | | 8/1956 | McVeigh |
| 4,335,997 A | * | 6/1982 | Ewing et al. ............... 416/185 |
| 4,543,132 A | * | 9/1985 | Berczik et al. ............. 148/671 |
| 4,581,300 A | | 4/1986 | Hoppin, III et al. |
| 4,705,463 A | | 11/1987 | Joco |
| 4,729,546 A | | 3/1988 | Allison |
| 4,743,165 A | | 5/1988 | Ulrich |
| 4,787,821 A | | 11/1988 | Cruse et al. |
| 4,850,802 A | * | 7/1989 | Pankratz et al. ......... 416/213 R |
| 5,161,950 A | | 11/1992 | Krueger et al. |
| 5,795,413 A | * | 8/1998 | Gorman ...................... 148/671 |
| 6,164,931 A | * | 12/2000 | Norton et al. ............... 417/407 |
| 6,324,831 B1 | * | 12/2001 | Izadi et al. .................... 60/796 |
| 6,691,910 B2 | * | 2/2004 | Hirose et al. ............. 228/114.5 |
| 7,052,241 B2 | * | 5/2006 | Decker ................... 416/213 R |
| 7,370,787 B2 | * | 5/2008 | Bacon et al. ............. 228/112.1 |
| 2002/0020733 A1 | * | 2/2002 | Hirose et al. ............. 228/114.5 |

* cited by examiner

*Primary Examiner*—Roy King
*Assistant Examiner*—Michael Aboagye
(74) *Attorney, Agent, or Firm*—Ingrassia Fisher & Lorenz, P.C.

(57) ABSTRACT

There is provided a method for fabricating a dual alloy structure that may in turn be machined to fabricate a rotary component such as an impeller for use in a gas turbine engine. The method provides a first titanium alloy and a second titanium alloy. The first titanium alloy displays characteristics, such as high strength, suitable for application in the bore area of an impeller. The second titanium alloy displays characteristics, such as high temperature creep resistance, suitable for use in the outer radial area of an impeller. A bore subelement is fabricated from the first titanium alloy. A body subelement is fabricated from the second titanium alloy. The bore subelement and body subelement are joined by inertia welding at a common welding surface. Each subelement and/or the resulting welded structure is heat treated to achieve a desired microstructure.

6 Claims, 3 Drawing Sheets

METHOD OF MANUFACTURE OF DUAL TITANIUM ALLOY IMPELLER

FIELD OF THE INVENTION

The present invention relates to methods and materials for manufacturing gas turbine engine components. More particularly the invention relates to improved methods and materials with which to manufacture impellers and impeller-like rotating components comprising more than one titanium alloy.

BACKGROUND OF THE INVENTION

In an attempt to increase the efficiencies and performance of contemporary jet engines, and gas turbine engines generally, engineers have progressively pushed the engine environment to more extreme operating conditions. The harsh operating conditions of high temperature and pressure that are now frequently projected place increased demands on engine components and materials. Indeed the gradual change in engine design has come about in part due to the increased strength and durability of new materials that can withstand the operating conditions present in the modern gas turbine engine.

The compressor stage of the gas turbine engine is one area that has seen increased demands placed on it. For example, increasing performance and reliability demands for gas turbine engines require both high compression ratios and reduced compression stages. Relatively higher compression ratios in turn result in high compressor discharge temperatures. A reduced number of compression stages to accomplish higher compression ratios results in higher compressor stage tip speeds and higher bore stresses. These combined demands have made it very difficult to utilize monolithic titanium alloy impellers for HPC stages of gas turbine engines. It would thus be desirable to develop a high pressure impeller that can withstand the increased pressures and temperatures associated with gas turbine engines. It is also desired that the impeller design be suitable to relatively smaller gas turbine engines. It has therefore been conceived that a dual alloy approach, combining a higher strength bore alloy and a high temperature outer blade ring material, offers a viable solution.

A rotary compressor such as an impeller undergoes differing stresses at differing locations. Typically a central opening or bore defines an axis about which the rotor spins. In the case of an HPC impeller, multiple airfoils extend radially outward from a bore and axially along the length of the bore. Additionally impellers wrap tangentially, from an inducer section near the inner diameter to the exducer near the impeller outer diameter. In operation, an impeller receives a fluid, such as air, at an upstream axial position. Due to the rotational movement of the impeller, the air is compressed. Typically a given volume of air that is being compressed is passed from an upstream position to a downstream position in the impeller. As the air exits the impeller, at an outwardly radial position, it is at a relatively higher pressure and temperature than it was when the air first contacted the impeller.

It should be noted that this general structure of a gas turbine impeller is also true of other rotary devices such as turbines found in turbochargers and turbopumps. The principles of the invention described herein are thus applicable to these devices as well.

As mentioned, an impeller is characterized by differing stresses at different impeller locations. Stresses due to rotation are greatest in the bore section. These stresses arise as a result of the high centrifugal forces that develop during high RPM operation. It is this area where cracks tend to develop and propagate. Hence, it is an important design criteria that materials in this area of the impeller have relatively high strength characteristics.

Differences in temperature also occur at different points in an operating impeller. As previously noted, air enters an individual impeller at a relatively lower temperature and pressure. When this same air exits the impeller it is at a relatively higher temperature and pressure. Thus, the upstream leading edge of an impeller airfoil at the inducer experiences relatively lower temperatures; and the outer radial edge of an impeller, the area where compressed gas exits, the exducer, experiences relatively higher temperatures. As a consequence, materials used in the gas exiting region must be selected to withstand these temperatures.

Hence there is a need for an improved impeller design and method to manufacture the same. The improved design should take advantage of material characteristics that provide high strength and high temperature performance. It is desired that the impeller, and the method of manufacturing the impeller, provide improved strength performance in bore regions while also providing improved high temperature performance in the outward radial positions. There is a need that the improved impeller design maintain advantageous weight performance of materials such as titanium alloys. The present invention addresses one or more of these needs.

SUMMARY OF THE INVENTION

The present invention provides a method and materials for fabricating a dual alloy gas turbine engine rotor. In particular the method may be applied to dual alloy impellers. The method is further applicable to impellers made of dual titanium alloys. The method includes inertia welding techniques to obtain reproducible, high quality adhesion between impeller subcomponents. Pre-welding and post-welding treatments further control residual stresses and impart microstructures appropriate for the end use application.

In one embodiment, and by way of example only, there is provided a method for fabricating an intermediate structure for use in fabricating an impeller comprising: providing a first titanium alloy with high strength properties; forming the first titanium alloy into a bore subelement; heat treating the bore subelement; providing a second titanium alloy with high creep resistance properties; forming the second titanium alloy into a body subelement; heat treating the body subelement; inertia welding the bore subelement to the body subelement so as to form an intermediate structure; and stress relieving and/or aging the intermediate structure. The method may further comprise forming the bore subelement and radial subelement with a corresponding mating surface. The step of inertia welding may further comprise inertia welding the bore subelement and the body subelement at the mating surface. The step of heat treating the bore subelement may further comprise a treatment that results in a final alloy microstructure having about 10 to about 50 volume percent primary alpha phase. The step of heat treating the body subelement may further comprise a treatment that results in a final alloy microstructure having about 10 to about 30 volume percent primary alpha microstructure. The step of heat treating the body subelement may further comprise a treatment that processes the alloy material below, above or through the beta transus point.

In a further embodiment, still by way of example only, there is provided an impeller for use in a gas turbine engine comprising a bore subelement; a body subelement inertia welded to the bore subelement; and a corresponding mating surface defined by the bore subelement and the body subelement wherein the bore subelement and body subelement are welded at the mating surface. The bore subelement may be fabricated of an alloy from the group consisting of Ti-6-2-4-6, Ti-6-2222S, VT22, and Ti-17 or any other similar high strength titanium alloy. The body subelement may be fabricated of an alloy from the group consisting of Ti-6-2-4-2, TiMetal 834, Ti-1100, and TiMetal 829 or similar high temperature alloys, including titanium alloys based on titanium intermetallic compositions such as alpha-two, orthorhombic or gamma. The impeller may further comprise a bore region of the impeller that is encompassed by the bore element; and a radial region of the impeller that is encompassed by the body subelement.

Other independent features and advantages of the method to fabricate a dual titanium alloy impeller will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings. Wherever possible, the same reference numbers will be used throughout the drawings to refer to the same or like parts.

Figure 1:
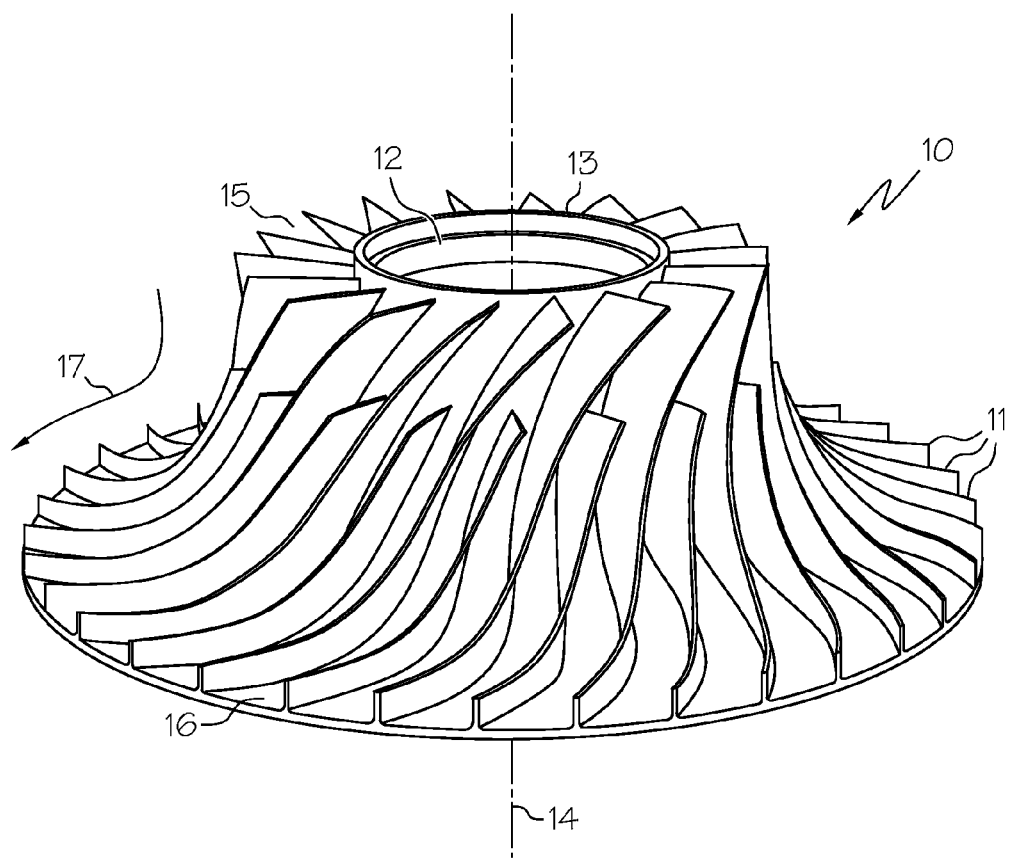
FIG. 1 is a schematic view of an impeller.
Figure 2:
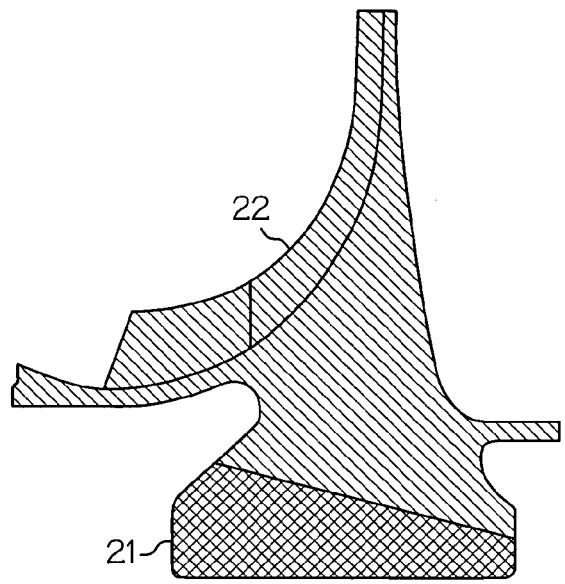
FIG. 2 is a side view of an impeller cross section illustrating dual titanium alloys according to an embodiment of the present invention.
Figure 3:
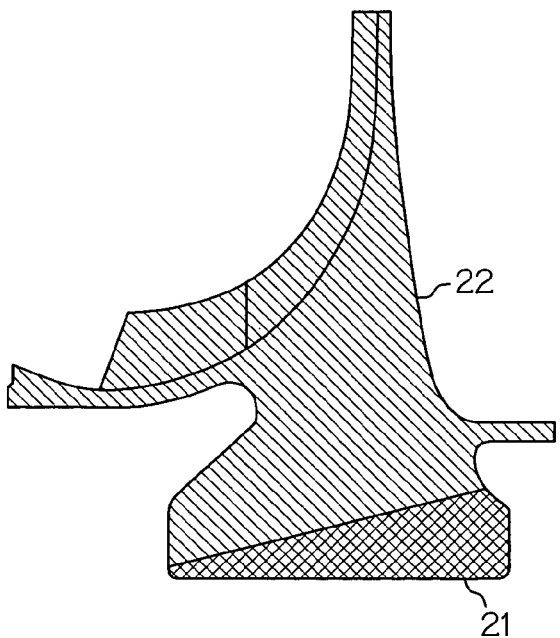
FIG. 3 is a side view of an impeller cross section illustrating dual titanium alloys according to an embodiment of the present invention.

Referring now to FIG. 1 there is shown a representation of a typical impeller suitable for use with the present invention. Impeller 10 includes a plurality of impeller airfoils 11 attached to a central core 12. Impeller 10 has a generally radial structure and, as shown in this figure, a central bore area 13. In some designs, impeller 10 is fabricated as a unitary piece with an axle and would not have an open bore area though it would have the corresponding bore region. Bore area 13 is aligned along an imaginary central axis 14 that runs through central bore area 13 in a axial direction. In operation impeller 10 is disposed on a central axle (not shown) at central bore area 13 and rotates thereon or rotates with the axle. Impeller blades 11 extend from central bore area 13 in an outwardly radial and axial direction. Impeller 10 further defines an upstream position 15 and downstream position 16.

Upstream position 15 and downstream position 16 correspond to the fluid path flow through and across impeller 10. Fluid, air, first enters impeller 10 at the upstream position 15 (inducer). As air passes impeller 10 it exits in the downstream position (exducer). Air passing across impeller is pressurized such that the air exiting impeller 10 is at a higher temperature and pressure relative to the air entering impeller. The direction of air flow 17 across the face of impeller 10, the face being that portion of impeller 10 which is exposed to air flow. In operation, impeller 10 is disposed within a housing or structure (not shown) which, by close proximity to impeller blades 11, assists in placing the air under pressure.

In the impeller configuration as shown in FIG. 1, impeller blades 11 press against air as the impeller 10 rotates. Impeller blades act to compress the air. The rotation of impeller during this compression imparts high tensile stresses in the bore region. Simultaneously, air that exits impeller 10 at downstream position 16 (exducer) is typically at a much higher temperature than compared to the air entering in the upstream position 15 (inducer). Temperatures in excess of 1000° F. can be experienced at downstream position 16 (exducer). Thus, the structure in the downstream position 16 and on the back face 23 (FIG. 4) are particularly subject to high temperature creep and fatigue.

It has now been discovered that an impeller can be designed and manufactured so that the impeller is comprised of multiple alloys. In one preferred embodiment, dual titanium alloys are joined to form an intermediate structure that may itself be further processed into a finished impeller. The finished impeller thus incorporates the dual titanium alloys of the intermediate structure.

The combination of materials to create the intermediate structure is selected so that material performance is optimized given the location of the material in the final product. The material that will be proximate to the bore of the impeller is selected for suitable strength properties. Similarly, the material placed in the area of the gas exit is chosen for suitable high temperature properties. Referring now to FIGS. 2, 3, 4, and 5 there are illustrated exemplary embodiments of the material selection in a silhouette of an impeller cross-section. In each illustration, region 21 represents the bore subelement, and region 22 represents a body subelement. As shown, bore subelement 21 and body subelement 22 can be fashioned so that a chosen material extends to a finished location on the impeller.

Figure 4:
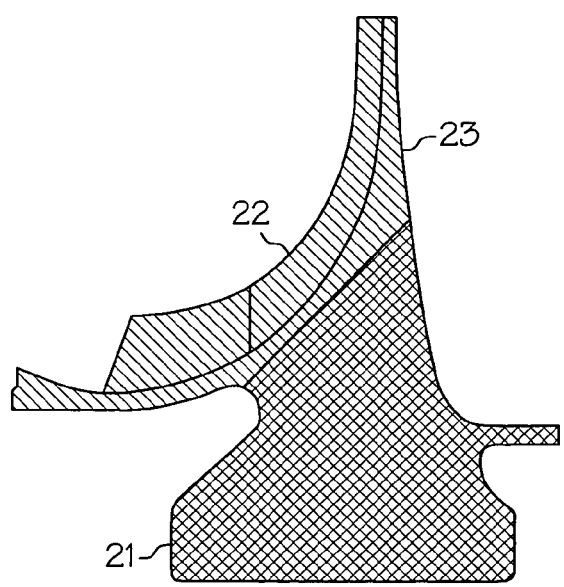
FIG. 4 is a side view of an impeller cross section illustrating dual titanium alloys according to an embodiment of the present invention.
Figure 5:
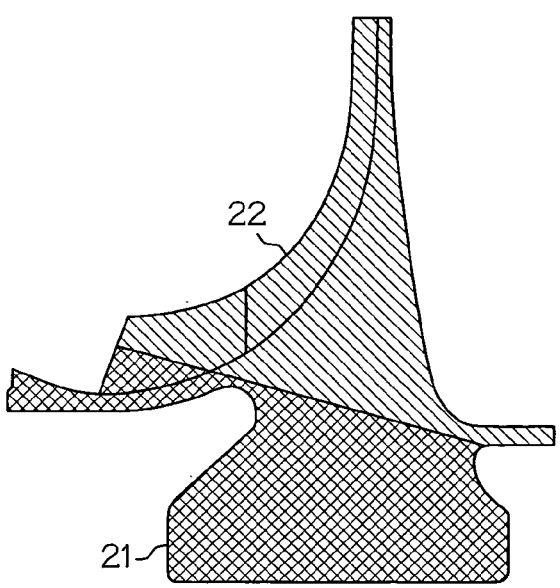
FIG. 5 is a side view of an impeller cross section illustrating dual titanium alloys according to an embodiment of the present invention.

Back face 23 of the impeller cross section is indicated in FIG. 4. Back face 23 is an area of an impeller where the elevated temperature properties of the material are important. Although the temperature is higher at the blade tip, the stress is also lower at the tip. It has been discovered that the back face area is generally an area where the stress and temperature combination becomes more critical. Thus, in a preferred embodiment, the composition of the region of the back face 23 is considered with respect to creep resistance.

Figure 6:
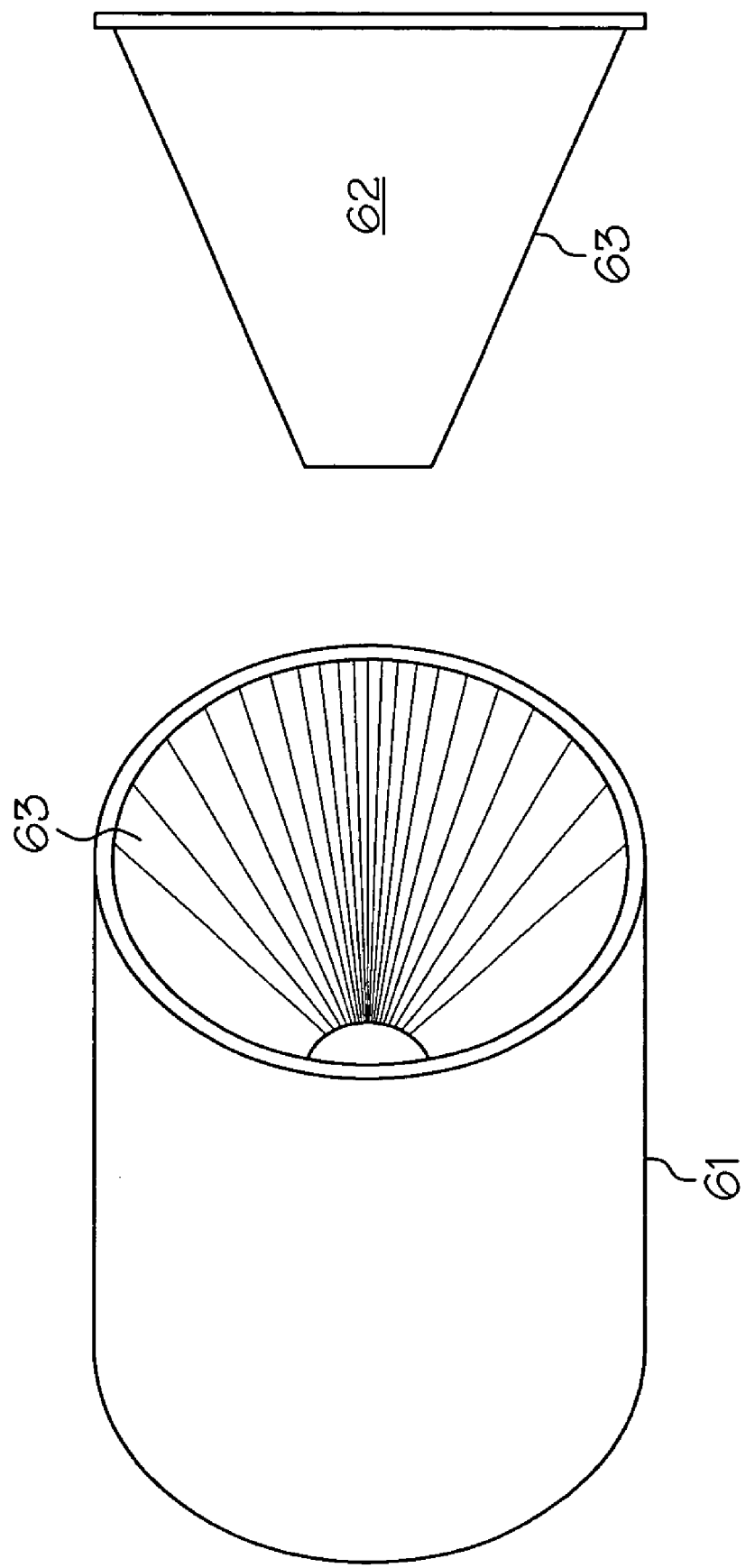
FIG. 6 is a perspective view of a bore subelement and body subelement according to an embodiment of the present invention.

A preferred method to manufacture the dual alloy impeller is further illustrated in FIG. 6. Here there is shown a bore piece 62 and body piece 61. Bore piece 62 and body piece 61 are configured so that they may be brought together in close mating alignment. In a preferred embodiment, bore piece 62 and body piece 61 are brought into mating alignment along a corresponding mating surface 63. In the preferred embodiment illustrated in FIG. 6 bore piece 62 is generally conical in shape. Mating surface 63 of bore piece 62 follows the line of the cone. Similarly, body piece 61 has a hollow that is in conical form. The mating surface 63 on body piece 61 also follows the cone. The slope of mating surface 63 in various embodiments is illustrated in FIGS. 2, 3, 4, and 5. Each of these figures illustrates a mating surface 63 having a different slope and/or position. When brought into close mating alignment, bore piece 62 and body piece 61 are in substantial contact along mating surface 63. Preferably, the contact is sufficient so that bore piece 62 and body piece 61 may be joined at mating surface 63 through inertia welding as described below.

Each of bore piece 62 and body piece 61 may be formed through known methods of forging, casting, powder metallurgy, and machining. Mating surface 63 on both bore piece 62 and body piece 61 may be formed through these known methods. Bore piece 62 and body piece 61 may include flanges, thrust faces, and other shapes that assist in the inertia welding process. The body piece 61 or subelement may include the airfoils described in FIG. 1 or material from which such airfoils may subsequently be formed.

Referring again to FIG. 6, bore piece 62 and body piece 61 can be joined at mating surface 63 through inertia welding. Upon completion of an inertia welding operation, what remains is an intermediate structure that includes both the original bore piece 62 and body piece 61. The weld between the two pieces is sufficiently strong and secure that the intermediate structure can be further machined and formed to create the finished impeller shape. Further, the bond is sufficiently strong to allow the joined pieces, when machined, to operate as an impeller.

In the preferred embodiment, bore piece 62 is itself fabricated from a first titanium alloy. This alloy is selected for high strength characteristics. Body piece 61 is fabricated from a second titanium alloy, an alloy chosen for good high temperature performance.

The preferred embodiment has been described as a method to fabricate an intermediate structure from two pieces. However, multiple pieces may be used to fabricate the intermediate structure. Further, the finished impeller may be fabricated of multiple regions or different composition. Likewise, it is preferred that mating surface 63 be linear in cross section. However, other shapes for mating surface 63 may be employed. For example, in cross section, mating surface 63 may include composite lines of differing angles, curves, or other complex shapes.

As illustrated in FIG. 6, bore piece 62 and body piece 61 contain excess material, material that will ultimately be machined away in order to yield a finished impeller shape. Both bore piece 62 and body piece 61 may themselves be cast, forged or formed by powder metallurgy techniques or otherwise machined so as to minimize the material that must be removed in order to create the impeller. Thus, body piece 61 need not have an outer shape in the form of a cylinder, but may take other shapes. Bore piece 62 may initially be formed so that it has a hollow axial area (not shown) that corresponds to where the central bore area 13 would appear, if such an area is part of the design of a finished impeller such as illustrated in FIG. 1. Alternatively, bore piece 62 may be formed with an integral axle.

In one embodiment, the fabrication method uses a welding technique of inertia welding. Inertia welding provides the energy needed to make the weld primarily by stored rotational kinetic energy. Generally, in inertia welding, a first work piece is connected to a flywheel. A separate work piece, the one to which the first work piece is to be joined, is restrained from rotating. The flywheel is accelerated to a desired rotational speed. The two pieces are then forced into contact. The kinetic energy stored in the rotating work piece and the flywheel is dissipated as heat through friction at the weld interface. If desired, the two work pieces may be pressed together through application of force on one or both of them.

Inertia welding is an advantageous method. The process is fast, up to many times faster than other welding techniques. Welding machines are versatile in that they can accommodate a wide range of part shapes and sizes. Joint preparation is not generally a critical prerequisite, and joints that have been forged, cast, machined, saw cut, or sheared can be welded. The joint that results from inertia welding is a forged-quality weld with a near 100% butt joint weld through the contact area. Melting may not occur through inertia welding. Material that is at, and close to, the mating surfaces are expelled during the welding process. By this process, all defects present at the initial interfaces are eliminated with the result that defects in the weld are minimized. Finally, as the process is machine-controlled, the process minimizes variations that occur through the human element.

In a preferred embodiment, dual alloy combinations are selected from high strength titanium alloys. Preferred titanium alloys include those near alpha titanium alloys with moderate temperature capability. Exemplary alloys that may be utilized for the inner subelement (bore piece 62) include Ti-6-2-4-6, Ti-6-2222S, VT22, and Ti-17 or any other similar high strength titanium alloy. Other titanium alloys with high strength up to moderate temperatures in the range of 400° F. to 900° F. may also be utilized.

Alloys that may be utilized for the outer subelement (body piece 61) include Ti-6-24-2, or any enhanced version of this alloy. Other alloys that may be utilized for the outer subelement (body piece 61) include TiMetal 834, Ti-1100, TiMetal 829, and other near alpha alloys with elevated temperature capabilities including titanium alloys based on titanium intermetallic compositions such as alpha-two, orthorhombic or gamma.

In a preferred embodiment the impeller manufacturing process includes pre-welding and post-welding treatments that are designed to control stresses and optimize the microstructure of the structure. It will be understood by those skilled in the art that a particular treatment (pre-welding treatment, post-welding treatment, or stress relief) may be tailored depending on the composition of the given alloy. That is to say a change in alloy may call for a change in the specifics of a heat treatment. However, preferred treatments can be defined in terms of the microstructure that results from the treatment. Thus, with respect to alloys used in the bore subelement, it is desired that a heat treatment result in a final alloy that includes about 10 to about 50 percent primary alpha microstructure. With respect to the subelement used to fashion the outer(body) subelement, the desired microstructure also depends on whether the subelement is alpha+beta processed or beta processed. For alpha/beta alloys, in alpha+beta processed condition, it is desired that the final microstructure include about 10 to about 20 percent primary alpha microstructure. For beta processed subelements, is desired that the material be processed above or through the beta transus.

A preferred titanium alloy combination utilizes Ti-6-2-4-6 for the bore subelement and Ti834 for the outer(body) subelement. When these materials are used, the following treatment is preferred. The bore subelement receives a preweld treatment of a heating of between 1600° F. to about 1800° F. The body subelement receives a preweld treatment between 1800 F to 2000 F. A second treatment follows which includes heating to a temperature between about 1000° F. to about 1600° F. Following this there is an age treatment at approximately 1100° F. The general goal of the heat treatment is to bring the bore titanium alloy to a finished microstructure comprising between about 10 to about 50 percent primary alpha. The balance may be a mixture of secondary alpha material and beta material. The microstructure aim for the body subelement will depend on the pre-weld processing (alpha+beta or beta).

It will be understood by those skilled in the art that the target microstructure may be achieved while deviating from the above-described heating times and temperatures. For example a material may be heated at a slightly higher temperature for a shorter time period, or, heated at a slightly lower temperature for a longer period of time. Thus, it is still within the invention to deviate from the specific heating schedule while achieving the finished microstructure.

In addition, certain heat treatments or stress relief operations may be combined. Thus, one heat treatment may be applied to separate pieces, such as bore piece 62 and outer (body) piece 61, while they are still separate pieces. As separate pieces, bore piece 62 and outer (body) piece 61 can receive separate heat treatments. After welding of these pieces, further heat treatments may be applied to the intermediate structure. Such a heat treatment to the intermediate structure will of necessity be a heat treatment that applies to both the region of the bore piece and the region of the outer piece. Thus, it is within the scope of the invention to combine heat treatments both pre and post welding.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for fabricating an impeller having a first region and and a second region, the first region having predetermined strength properties, and the second region having a predetermined creep resistance properties, the method comprising the steps of:

providing a first titanium alloy formulated to be capable of having the predetermined strength properties imparted thereto;

forming the first titanium alloy into a bore subelement having a first mating surface including a first conical shape;

heat treating the bore subelement;

providing a second titanium alloy formulated differently than the first titanium alloy and to be capable of having the predetermined creep resistance properties imparted thereto;

forming the second titanium alloy into a body subelement, the body subelement including a hollow portion defined by a second mating surface including a second conical shape corresponding to the first conical shape of the first mating surface;

heat treating the body subelement;

inertia welding the first mating surface of the bore subelement to the second mating surface of the body subelement so as to form an intermediate structure;

stress relieving the intermediate structure to optimize a microstructure of the intermediate structure, to impart the predetermined strength characteristic to the bore subelement, and to impart the predetermined elevated temperature performance characteristic to the body subelement; and machining away excess material from the intermediate structure to form the impeller.

2. The method according to claim 1 wherein the step of heat treating the bore subelement further comprises a treatment that results in a final alloy microstructure having about 10 to about 50 per cent primary alpha phase material.

3. The method according to claim 1 wherein the step of heat treating the body subelement further comprises a treatment that results in a final alloy microstructure having about 10 to about 30 per cent primary alpha microstructure.

4. The method according to claim 1 wherein the step of heat treating the body subelement further comprises a treatment that processes the alloy material above or through the beta transus point.

5. The method according to claim 1 wherein the step of providing a first titanium alloy further comprises selecting an alloy from the group consisting of Ti-6-2-4-6, Ti-6-2222S, VT22, and Ti-17.

6. The method according to claim 1 wherein the step of providing a second titanium alloy further comprises selecting an alloy from the group consisting of Ti-6-2-4-2, TiMetal 834, Ti-1100, and TiMetal 829.

* * * * *